Patented July 10, 1951

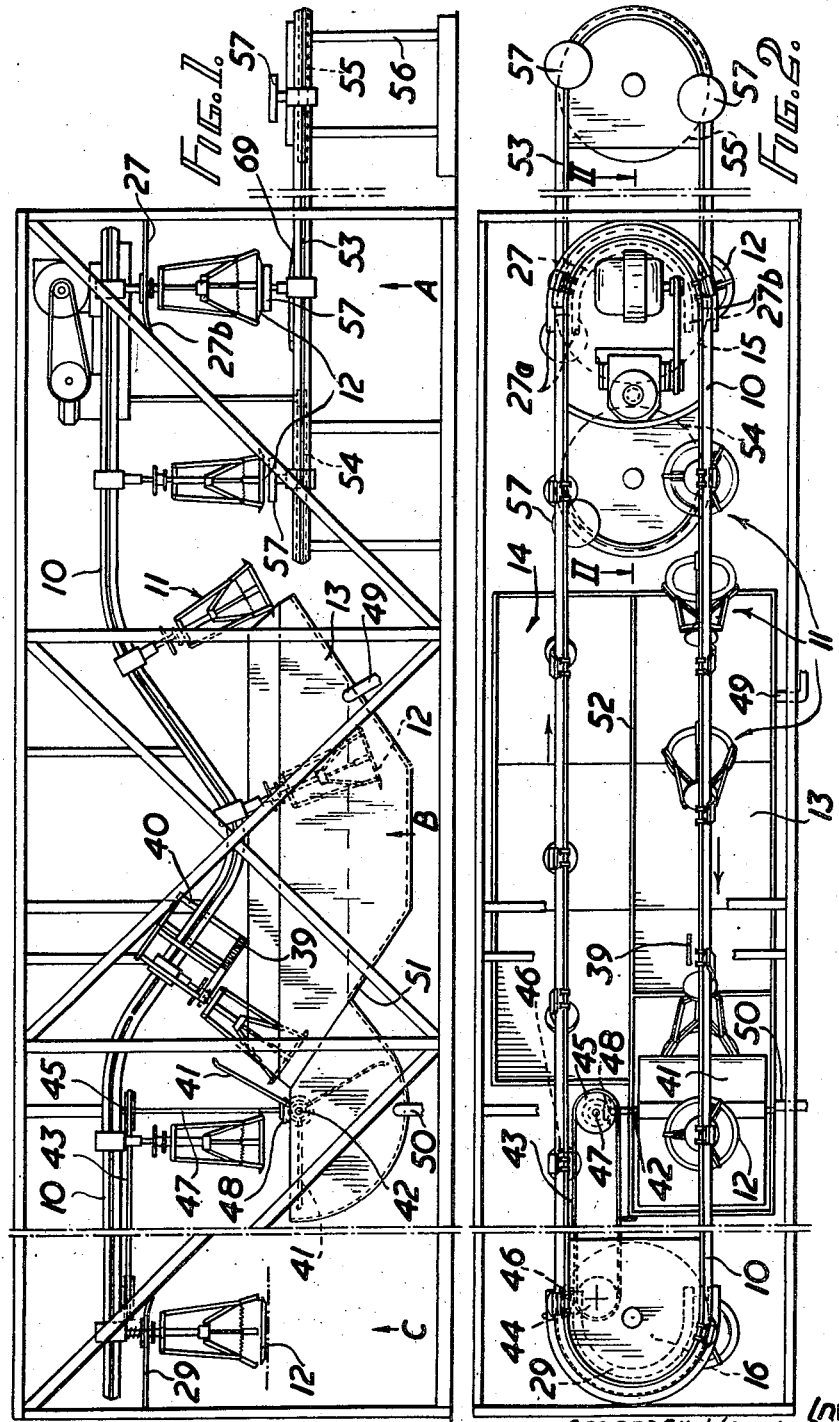

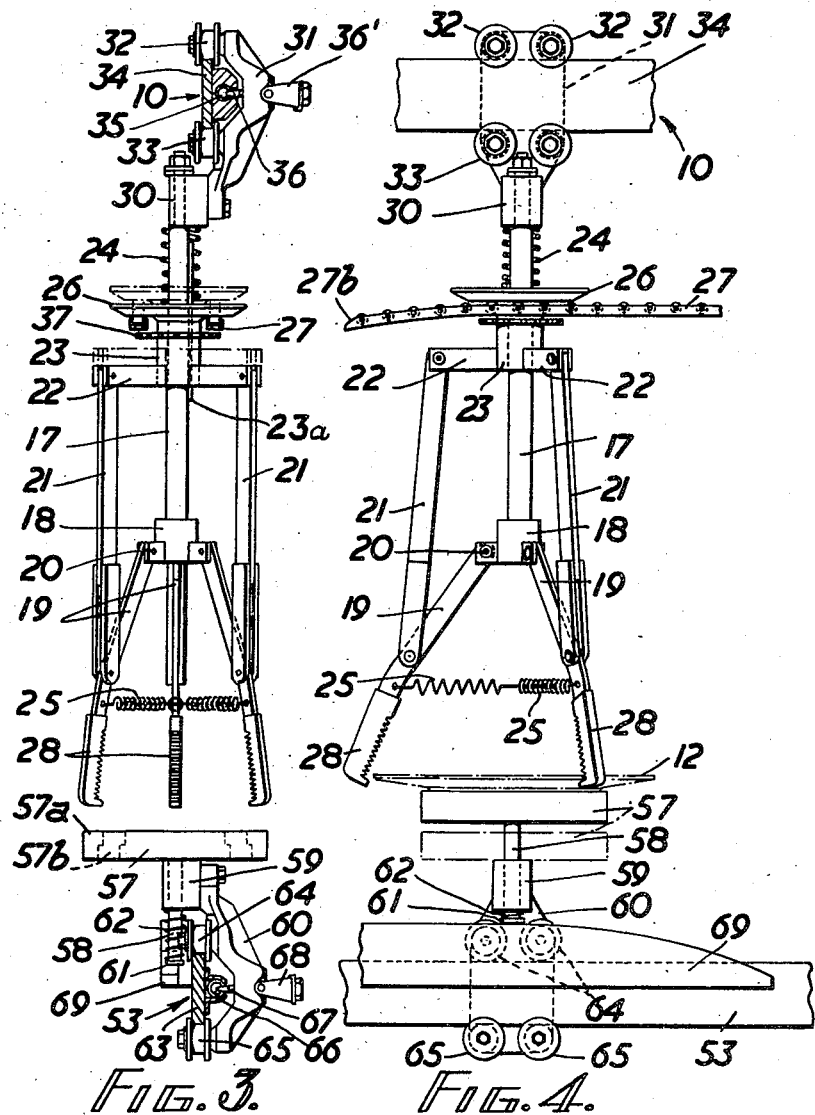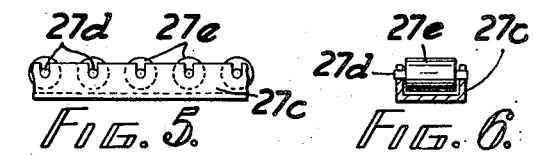

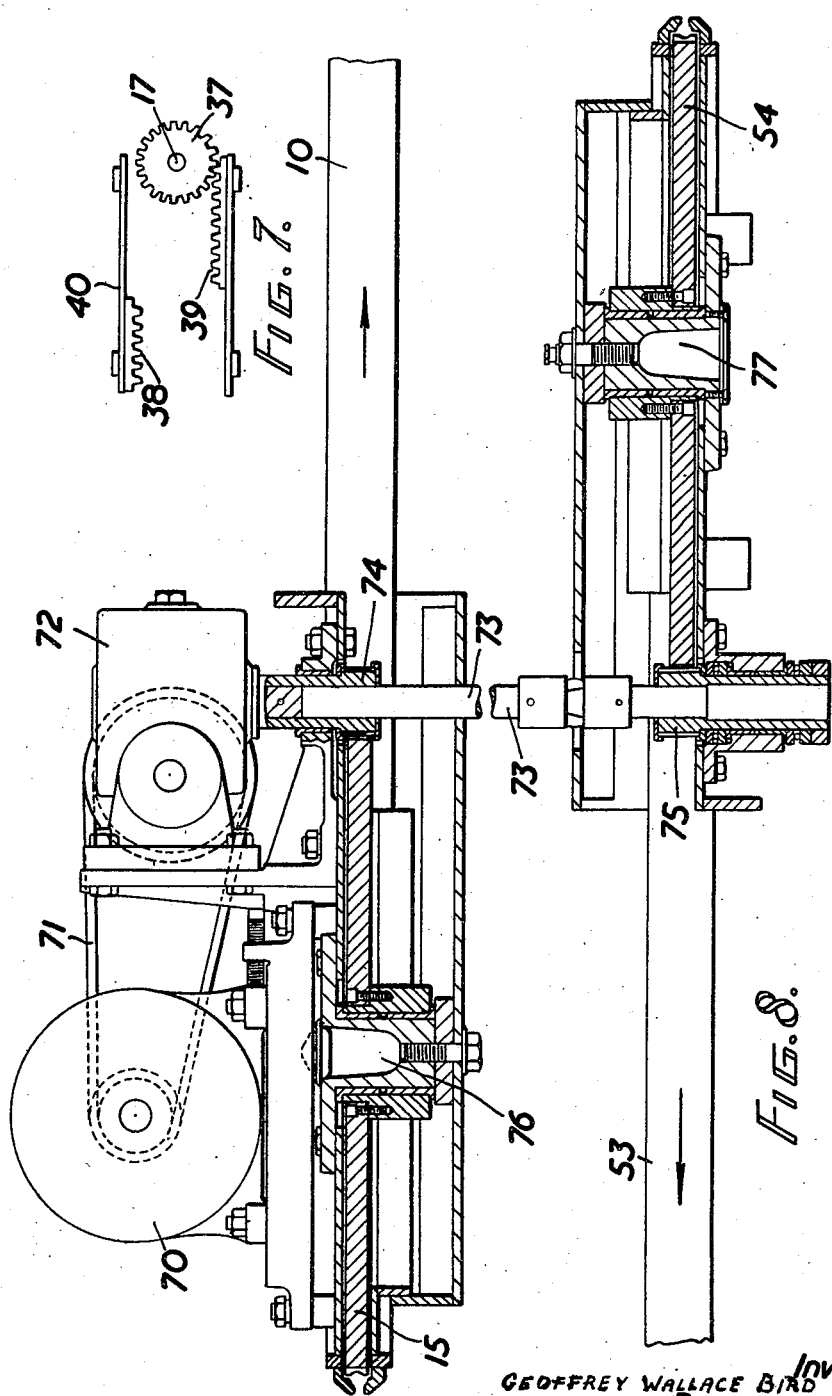

2,560,270

UNITED STATES PATENT OFFICE 2,560,270

APPARATUS FOR USE IN GLAZING EARTHENWARE ARTICLES

Geoffrey Wallace Bird, Water Stratford, England, assignor to Taylor Stoker Company Limited, Euston, London, England, a British company Application January 21, 1948, Serial No. 3,588
In Great Britain January 23, 1947

6 Claims. (Cl. 91—46)

1

This invention relates to apparatus for use in glazing earthenware and china articles.

Earthenware and china articles which are to be glazed are first dipped into a glaze bath, are then agitated to remove surplus glaze and, after drying, are finally "fired" in a furnace.

In accordance with present practice the dipping operation and subsequent agitation to remove surplus glaze are effected by hand. A skilled "dipper" receives the articles from the biscuit ovens and immerses them successively in the glaze (usually lead). Subsequently to the removal of each article from the glaze bath, the dipper imparts a twisting motion to the article, the direction of which he suddenly reverses, and thereby all the surplus glaze is removed. If the articles are of more than a given diameter the "dipper" has to employ a wire extension on his thumb.

The present invention has for its object the provision of mechanical means for glazing earthenware and china articles whereby manual labour is largely eliminated, and according to the invention the apparatus comprises an endless conveyor and carrier, holder or like means arranged at intervals along said conveyor for supporting the article to be glazed and carrying said article through a glaze bath while being carried along by said conveyor.

In accordance with further features of the invention means are provided for feeding the articles to be glazed individually to said carriers or holders, prior to the articles being passed through the glaze bath, and for releasing or removing them from said carriers or holders after they have been passed through the glaze bath, means also being provided for agitating the articles, in order to remove surplus glaze after they have been passed through the glaze bath and before being released or removed from the carriers or holders.

In order that the invention may be more clearly understood one particular embodiment thereof will now be described, by way of example, with reference to the accompanying drawings in which:

Figure 1 is a general view of the apparatus according to the invention in side elevation, Figure 2 is a plan view thereof, Figure 3 is an elevational view on an enlarged scale showing one of the carriers or holders and a part of the means for feeding articles to be glazed to said carrier or holder, Figure 4 is a similar view illustrating the manner in which the articles to be glazed are transferred from the feeding means to said carriers or holders, Figures 5 and 6 are a side elevation and section respectively of a cam rail for actuating the carriers or holders, Figure 7 is a detailed plan view showing the means for spinning or agitating the carriers or holders, and Figure 8 is a part sectional view on the line II—II of Figure 2 showing the driving means for the conveyors.

In the particular embodiment illustrated the apparatus is designed especially for glazing plates and comprises an endless cable conveyor 10 of the kind known under the registered trade-mark "Teleflex" having mounted, at intervals along it, a number of carriers or holders 11 adapted to hold the articles 12 (in the example shown, plates). At the point A along said conveyor 10 the carriers 11 pick up the plates, and at the point C release them and, at the point B between said pick-up and release points A and C, said carriers 11 pass the articles through a bath 13 of the glaze liquid. After the articles have thus been passed through the glaze bath 13 and released from the carriers 11 said carriers are returned by the conveyor to the pick-up point A and during the return run are passed through a cleansing bath 14 whereby any surplus glaze adhering thereto is removed.

Said conveyor 10 runs in a general horizontal plane on two end pulleys 15, 16 which are spaced apart horizontally, and the carriers 11 extend in a downward direction from the conveyor as shown in Figure 1. The plates 12 are held at the ends of said carriers 11 remote from the conveyor 10 and in such a manner that they are more-or-less parallel to the conveyor. Each run of the conveyor is in general horizontal, but makes a downward dip at point B intermediate the end pulleys 15 and 16 where it passes over the glaze and cleansing baths 13 and 14 respectively. During this downward dip of the conveyor on its forward run the plates 12 are successively completely immersed in the bath 13 of the glaze liquid, and during the downward dip on the return run of the conveyor the carriers 11 are passed through the bath 14, containing cleansing liquid, whereby any surplus glaze adhering thereto is washed off so that said carriers are cleansed prior to picking up and conveying further plates through the glaze bath 13 on the next forward run of the conveyor.

Each carrier 11 (see Figures 3 and 4) comprises a central rod 17 which extends downwardly from the conveyor 10 at right angles thereto. At its lower end said rod carries a head 18 and three gripping arms 19, which operate in the manner of a grapple, which constitute jaws for gripping the plates 12, having their upper ends pivotally mounted at 20 on the said head 18. These gripping arms are pivotally connected, about midway of their length, to the lower ends of respective connecting links 21 whose upper ends are pivotally connected to radial arms 22 mounted on a sleeve 23 which is slidably mounted on the central rod 17, but keyed, by means of a key 23a, so as to prevent its rotation thereon. It will thus be seen that a downward movement of said sleeve 23 will effect a closing movement (Figure 3) of the gripping arms 19, and that upward movement of said sleeve will effect opening movement (Figure 4) of said gripping arms. Said sleeve may be biased downwardly, by means of a coil spring 24 on the central rod 17, to a limiting position at which the outer ends of the gripping arms 19 are closer together than the diameter of a plate. In addition to or instead of the coil spring 24 coil springs 25 may be provided between the gripping arms 19, as shown in Figures 3 and 4.

Rigidly mounted on the slidable sleeve 23 is a disc or cam member 26 which, just as the carrier is finished its rearward run (see Figure 2) engages the downwardly curved ends 27a of a pair of fixed rails 27 which run in a semi-circular path and between which the sleeve 23 passes. Said rails thus, by cam action, force said cam part 26 and therefore said sleeve 23 upwardly along the central rod 17 to a position such that the ends of said gripping arms are wider apart than the diameter of a plate 12 (Figure 4). When said cam member 26 clears the downwardly curved end 27b of said cam rails 27 i. e. shortly after the carrier has started its forward run, the gripping arms again close towards one another under the action of the springs 25 (and/or 24) but, in the meantime, a plate 12 has, as will hereinafter be described, been introduced into position between the ends of said gripping arms, and the latter will therefore close on the periphery of said plate 12 and hold the same at three or more points around that periphery.

The plates 12 are held at a constant distance from the conveyor 10, despite variations in the size of plates, by virtue of the fact that a series of serrations are formed on the inner gripping edge of the set of arms 19, or preferably on the inner edges of rubber shoes 28 fitted to the ends of said arms 19. In this way each article will be gripped by the serrations as the set of gripping arms 19 closes upon it, without appreciable slip. The series of serrations will therefore extend over a length of the inner edge of each arm 19, or rubber shoe 28 fitted thereon sufficient to ensure that the jaws will present the serrations to any article within the range of size to be encountered.

The cam rails 27 may be of any suitable construction but are preferably constructed as shown in Figures 5 and 6. Referring to these figures each rail is formed from a channel section iron 27c having formed in its flanges spaced slots 27d which form seatings for the trunnions of rollers 27e. Cam rails of this construction reduce friction between the rails and the cam part 26 to a minimum and thus ensure smoth running of the cam part over said rails.

Each carrier 11 throughout its forward run continues to carry the plate 12 and, when said carrier makes its downward dip at point B, dips said plate into the glaze liquid which is in the glaze bath 13 located beneath the conveyor 10. As each carrier reaches the end of its forward run (see Figure 2) the cam part engages a further pair of cam rails 29, which are of the same construction, and operate the carrier in the same manner as cam rails 27, to cause the gripping arms to open and thereby drop the plate 12 at point C on to any suitable conveyor or like means (not shown) for conveying said plate to drying and firing furnaces. Shortly afterwards said cam part 26 clears said additional rails 29, and the gripping arms 19 again spring to their limiting position, which they maintain throughout the return run and until the first-named rails 27 are again reached. The cam rails 29 may be movably arranged so that successive carriers 11 can be activated to permit successive articles to be discharged at different points from the conveyor 10.

The rod 17 of the carrier assembly 11 is rotatably mounted (for the purpose hereinafted described) in a bushing 30, see Figures 3 and 4, which forms part of a bracket 31 by means of which the carrier assembly 11 is connected with the endless conveyor 10. Mounted on the bracket 31 are two pairs of grooved rollers 32, 33 which embrace the upper and lower edges respectively of the rigid rail 34 of the conveyor. The bracket 31 carrying the carrier assembly 11 is detachably connected with the driving cable 35 of the conveyor by an auxiliary movable spring loaded pin or plunger 36 which engages the driving cable 35 of the conveyor. The said pin or plunger 36 is normally held in engagement with the conveyor cable 35 by its spring (not shown) but can be moved out of engagement with said cable by a hand operated lever member or the like 36'. In this maner the bracket 31, with the whole of the carrier assembly 11, can be moved manually along the rail 34 relative to the cable 35 to any desired position along the conveyor; thus the spacing of the carriers 11 relative to each other can be adjusted as desired.

For the purpose of removing surplus glaze from the plates as they are carried out of the glaze bath by the carrier 11 each of said carriers, just after they leave the tank 13 of glaze liquid, is rotated rapidly so that the plate is thus spun about its axis and the surplus glaze is flung off by centrifugal force.

To this end a pinion 37, or a toothed annulus, is formed or mounted on the sleeve 23, which pinion engages fixed racks 38, 39 so located that said pinion 37 engages them one after the other, one of said racks being on one side and the other on the other side of said pinion teeth, so that said slide carrier assembly 11 is rotated first in one direction and then in the other by its engagement with each rack. The racks 38, 39 are fixed in their respective positions in a bracket or frame member 40 which is mounted on the main framework of the apparatus. Although in the embodiment shown two racks 38, 39 are provided to cause rotation of the carriers 11 in reverse directions, it has been found that in some cases the spinning of the carriers in one direction only is sufficient to remove the surplus glaze from the plates, thus in such cases it is necessary to provide only one rack. On the other hand it may be desirable in certain circumstances to provide more than two racks, so that the direction of spin is reversed more than once.

This spinning of the plate is effected shortly after it leaves the glaze liquid and while it is still moving at an angle upwardly from the dip, The glaze liquid which is thrown rearwardly will be thrown into the main body of liquid in the glaze bath and that which is thrown sideways will be caught by the walls of the glaze bath and will run back into the main body of liquid. That which is thrown forwardly however along the path of travel would in the ordinary course impinge on the preceding plate and its carrier.

To prevent this a rotary baffle member 41 is provided. The baffle member moves forwardly in front of each plate whilst it is being spun, and obstructs the forwardly thrown glaze. In the embodiment shown the baffle member is provided with three baffle plates and is arranged to rotate somewhat in the manner of paddle wheels about a horizontal transverse axis 42 beneath the path of the plates in such a manner that each baffle plate, during part of its circle of movement, is adapted to move in front of a spinning plate 12. The baffle member is arranged to move synchronously with the movement of the conveyor 10 so that successive baffles move in front of successive plates. To this end the baffle member 41 is driven direct from the conveyor 10. Adjacent to and running parallel with the conveyor 10 is an endless belt 43 running on two pulleys 44, 45 mounted in suitable bearings in the main framework of the apparatus. Projecting outwardly from the belt 43 are three lugs, pins or other projections 46. The distance separating these lugs, pins or the like corresponds to the distance between the carriers or holders 11 on the conveyor 10 and they are arranged to project into the path of travel of a part of the carrier or holder assemblies, so that as each carrier or holder 11 is moved past the belt 43 it engages one of said pins or projections and carries it along with it thus driving the belt on the pulleys 44, 45. The pulley 45 is rigidly mounted on one end of a vertical shaft 47 which, at its opposite end is coupled to the horizontal shaft 42 on which the baffle member is mounted by means of bevel gearing 48. Thus it will be seen that the baffle member 41 is driven synchronously with the movement of the conveyor so that successive baffle plates move in front of successive carriers 11 as said carriers, carrying the glazed plate 12, are spun as they move out of the glaze tank 13.

The dipping tank 13 is divided longitudinally by a partition wall 52, the arrangement being such that one side of the tank constitutes the glaze bath 13 situated immediately below the forward run of the conveyor 10 so that the carriers 11, when carrying the articles to be glazed, are dipped down into said glaze bath, and the other side of the tank constitutes the cleansing bath 14 and is situated immediately below the return run of the conveyor so that the carriers 11, after having deposited the articles at point C on, for example, a delivery conveyor (not shown), are dipped down into the cleansing bath 14 on their return run. If desired a suitably arranged rack (similar to 38, 39) may be provided with which the pinion 37 on the carrier members 11 engage as said carriers pass through said cleansing bath 14 whereby said carrier members are spun or rotated while dipped in the cleansing liquid.

The cleansing bath is preferably provided with a suitably located inlet and outlet so that the cleansing liquid can be continuously withdrawn and returned to the cleansing bath and in the process the entrained glaze will be separated out and returned to the glaze bath. This will materially reduce the consumption of the glaze.

The glaze bath 13 is provided with an inlet 49 at one end and an outlet 50 at the other, to enable glaze to be fed continuously through the bath, and a dam 51 is provided intermediate its inlet and outlet ends to regulate the depth of glaze, said dam being so arranged that the surplus glaze returned to the bath by means of the aforesaid baffle member 41 is returned on the outlet side of said dam.

For introducing each plate into position to be gripped by the gripping arms of the carriers 11 as above described, a horizontal endless feed conveyor 53 is provided which on its forward run conveys a succession of the plates at spaced intervals in a horizontal line underneath and parallel to the horizontal line of movement of the gripping jaws at point A, that is at the beginning of the forward run of the carriers. The movement of the conveyors 10 and 53 are synchronised so that each successive plate on the feed conveyor 53 moves immediately underneath, and at the same speed as, each carrier 11 during the period that the set of gripping jaws are wide open as heretofore described and, when said gripping jaws are permitted to close, their ends close on the plate beneath as heretofore described. Just after the point when each plate is gripped by the gripping jaws the feed conveyor 53 turns in a horizontal direction to make its return run. The conveyor 53 is of the same kind as the conveyor 10 and runs in a general horizontal plane on two pulleys 54, 55; the pulley 54 being suitably mounted in the main frame work of the apparatus and the pulley 55 being mounted in suitable bearing in a frame support 56. Mounted along the conveyor 53 at intervals, corresponding to the intervals between the carrier 11 on conveyor 10, are a number of supports or stands for supporting the plates or other articles to be fed to the carriers 11. These supports each comprise a table or stand 57 (see Figures 3 and 4) on which the articles are placed, and each of said supports or stands 57 is preferably provided with concentric serrations or concentric rows of conical projections on its upper surface so as to allow the plates or other articles to be automatically located centrally with respect to said support or stand and to prevent said plates or other articles from slipping on the supporting surface. The supports or stands 57 may be made adjustable in size, i. e. diameter, by providing removable rings 57a, 57b, adapted to be fitted around the outer periphery of said stands or supports as shown in Figure 3.

The supports or stands 57 are each mounted on a central rod 58 vertically slidable in a boss or the like 59 bolted to a bracket 60 by means of which said supports or stands 57 are connected with the conveyor 53. At the lower end of the rod 58 is provided a domed head 61 and between this domed head and the boss 59 is arranged a coil spring 62 which tends to urge the stand or support into its lowermost position as shown in chain dotted lines in Figure 4. The stands or supports 57 are mounted on the conveyor 53 in the same manner as the carriers 11 are mounted on conveyor 10, that is the conveyor rail 63 is embraced by two pairs of grooved rollers 64, 65 mounted on bracket 66 and the stand assembly is operatively connected with the conveyor cable 66 by a spring loaded pin or plunger 67 operated by a hand lever or the like 68. Thus the stands or supports can be moved along the conveyor rail 63, relative to the conveyor cable 66, to vary their spacing in relation to each other in the same way that the spacing of the carriers 11 can be adjusted along the conveyor 10.

Rigidly mounted on a stationary part of the conveyor 53 at position A, i. e. immediately below the position where the gripping arms of the carriers pick up the plates or other articles, is mounted a cam rail 69 over which the domed head 61 on the rod 58, carrying the stand or support 57, slides and thereby causes the said stand or support to be raised into position to bring the plate 12 into position between the gripping arms of the carrier 11 (see Figure 4). Soon after the plate 12 has been raised into this position the gripping arms of the carrier 11 close around the periphery of the plate 12, as above described, after which the support or stand 57 is lowered away from the plate as the vertically slidable rod 58 supporting it moves out of engagement with the cam rail 69.

In operation plates 12 or other articles to be glazed are placed on each of the stands 57 by hand as they move, during their forward run, towards the point A of the apparatus. At this point the plates are raised by the supports or stands 57 and are picked off said stands, as above described, by the carriers 11 which then convey them through the glaze bath 13 at point B and then agitate them by spinning, as above described, to remove the surplus glaze and finally deposit them on to a delivery conveyor at point C, whereupon said carriers return, passing through the cleansing bath 14 to repeat the operation.

When at the end of the forward run each carrier 11 deposits its plate 12, the latter drops only a very small distance on to any suitable delivery conveyor (not shown) by which it is conveyed through the drying oven where the glaze is dried prior to inspection and firing. Like the feed conveyor, this delivery conveyor moves just underneath the gripping jaws of the carriers at the end of their forward run and thus, when each set of gripping jaws is opened, as above described, the plate is deposited gently on to the delivery conveyor beneath. The plates may be deposited on stands on said delivery conveyor, which are designed so as to affect the glaze, still in a wet state, as little as possible and said delivery conveyor may be arranged to run parallel with the carrier conveyor 10 in the same manner as the feed conveyor 53, or may be arranged to run at right angles thereto so as to convey the glazed plates sideways out of the apparatus.

As will be understood the carrier conveyor 10 and the feed conveyor 53 must be driven in synchronism and at the same speed; the two conveyors are thus preferably driven by the same motor through a common driving shaft. One particular arrangement for driving the two conveyors is illustrated in Figure 8 in which an electric, or other suitable motor 70 is coupled, by means of a belt drive 71, through any suitable reduction gearing 72, with a vertical driving shaft 73. The shaft 73 is coupled to the pulley 15 of the carrier conveyor by a pinion 74, which meshes with the toothed periphery of said pulley 15, and said shaft 73 is coupled with the pulley 54 of the feed conveyor by means of a pinion 75 which meshes with the toothed periphery of said pulley 54. The two pulleys are rotatably mounted on suitable bearing members 76 and 77.

It will be understood that the invention is not limited to the details of construction described with reference to the accompanying drawing, for instance it will be obvious that the invention can be adapted for glazing other earthenware articles than plates, furthermore the main conveyor could be arranged to make a plurality of dips during its forward run, and dip the articles successively into a plurality of glaze baths.

I claim:

1. A glazing machine for glazing earthenware and similar articles comprising in combination an endless conveyor arranged in a generally horizontal plane and including at least one downward dip, a dipping tank for a supply of a glaze bath positioned below said downward dip of the conveyor adjacent thereto, article carriers rotatably supported on said conveyor at spaced intervals to travel together with the conveyor, each of said carriers comprising downwardly extending gripping arms, a vertically downwardly extending rod, pivot means pivotally linking the upper ends of said arms to the rod, the lower portions of said gripping arms forming jaws adapted to grip an article to be glazed in the manner of a grapple, spring means secured to the lower portions of the arms for biasing the same into a gripping position, cam rider means axially slidable on said rod, and links pivotally connecting said cam rider means with each of said gripping arms so as to control the relative position of said gripping arms by varying the vertical position of the cam rider means on the rod for moving the gripping arms into a spread and a closed position respectively, first carrier actuating means including cam members mounted stationarily relative to the conveyor and positioned to engage said cam rider means so as to lift the same relative to the respective rod for a predetermined distance of travel of a carrier, thereby spreading said gripping arms for the said predetermined distance, said actuating means being positioned anterior to said downward dip as seen in the direction of travel of said conveyor, feeding means for feeding articles to be glazed individually to each of said carriers when and while the gripping arms of a respective carrier are spread, said feeding means being arranged in a generally horizontal plane, means for agitating said carriers to remove surface glaze from the articles carried thereby, when the articles have been carried through the glaze bath, said agitating means comprising driven means mounted on each cam rider means and driving means stationarily mounted alongside the conveyor, the said driven and driving means being positioned in a relative position in which they engage each other for a predetermined distance of travel of the conveyor so as to impart a rotary motion to the carrier for the said predetermined distance of travel, and second carrier actuating means including cam members mounted stationarily relative to the conveyor and positioned to engage said cam rider means so as to lift the same relative to the respective rod for a predetermined distance of travel of a carrier, thereby spreading said carrier arms for releasing gripped articles from the carriers, said second actuating means being positioned posterior to said downward dip and said agitating means as seen in the direction of travel of the conveyor.

2. A machine as described in claim 1 wherein said driven means comprise pinion teeth secured to the cam rider means of each carrier, and wherein the stationary driving means comprise rack means engageable with said pinion teeth as the respective carrier passes the rack means, thereby causing rotation of the said carrier.

3. A machine as described in claim 2, wherein said rack means comprise a pair of rack elements disposed on opposite sides of the conveyor staggered in the direction of travel of said carriers, said rack elements being successively engageable with the pinion teeth of a passing carrier, thereby rotating the respective carrier successively in opposite direction.

4. A machine according to claim 1, wherein said feeding means comprise an endless feed conveyor disposed for travel in a generally horizontal plane beneath and parallel to the carrier conveyor, and a plurality of article support means supported on the feed conveyor for travel together therewith and disposed at intervals corresponding to the intervals of said carriers, the movement of said carrier conveyor and said feed conveyor being synchronized so as to move successive support means into a pick-up position in which the gripping arms of a carrier are spread and in which an article placed upon a support means is within reach of the said separate gripping arms.

5. A machine as described in claim 4, in combination with drive means for the carrier conveyor and for the feed conveyor, said drive means being arranged to maintain a predetermined relative travel speed between said conveyors so that successive support means reach the pick-up position when a carrier is in the position in which the gripping arms of the said carrier are spread for gripping an article placed upon the respective support means.

6. A machine as described in claim 5, wherein said support means comprise a vertically slidable member and a support element mounted on said member for vertical displacement together therewith, and wherein a cam rail is mounted stationarily relative to the feed conveyor and engageably with said slidable member in a position for raising the support element while and when the said slidable member passes the cam rail, the said cam rail being positioned relative to the feed conveyor so as to become engaged with a slidable member when the respective support means reaches the aforesaid pick-up position.

GEOFFREY WALLACE BIRD.

REFERENCES CITED

The following references are of record in the file of this patent:

UNITED STATES PATENTS

| Number | Name | Date |
|---|---|---|
| 928,172 | Bernardin | July 13, 1909 |
| 1,056,291 | Nazel | Mar. 18, 1913 |
| 1,130,383 | Ellison | Mar. 2, 1915 |
| 1,176,971 | Marsh et al. | Mar. 28, 1916 |
| 1,708,429 | Mueller et al. | Apr. 9, 1929 |
| 1,759,502 | George et al. | May 20, 1930 |
| 1,977,704 | Vaughn et al. | Oct. 23, 1934 |
| 2,044,077 | Jones | June 16, 1936 |
| 2,428,141 | Burkhardt | Sept. 30, 1947 |